United States Patent
Hierden

(10) Patent No.: US 6,631,672 B2
(45) Date of Patent: Oct. 14, 2003

(54) METHOD AND APPARATUS FOR PROCESSING LARGE SQUARE HAY BALES INTO SMALLER RECOMPRESSED BALES

(75) Inventor: Ed Van Hierden, Lethbridge (CA)

(73) Assignee: Hunterwood Technologies, Ltd., Cochrane (CA)

( * ) Notice: Subject to any disclaimer, the term of this patent is extended or adjusted under 35 U.S.C. 154(b) by 0 days.

(21) Appl. No.: 09/935,587

(22) Filed: Aug. 24, 2001

(65) Prior Publication Data

US 2002/0023550 A1 Feb. 28, 2002

Related U.S. Application Data

(62) Division of application No. 09/471,235, filed on Dec. 23, 1999, now Pat. No. 6,339,986.

(30) Foreign Application Priority Data

Nov. 3, 1997 (CA) .............................................. 2220627
Sep. 20, 1999 (CA) .............................................. 2282838

(51) Int. Cl.[7] ............................. B65B 13/00; B30B 1/00
(52) U.S. Cl. ............................. 100/3; 100/7; 100/188 R
(58) Field of Search ............................. 100/3, 6, 7, 35, 100/94, 95, 96, 97, 188 R, 174

(56) References Cited

U.S. PATENT DOCUMENTS

| | | | | |
|---|---|---|---|---|
| 3,762,310 A | * | 10/1973 | Wright ........................... | 100/3 |
| 4,676,153 A | * | 6/1987 | Ast ................................ | 100/7 |
| 4,718,335 A | * | 1/1988 | Ast ................................ | 100/3 |
| 4,763,574 A | * | 8/1988 | Ast ........................... | 100/98 R |
| 5,893,309 A | * | 4/1999 | Ast ............................... | 83/35 |

FOREIGN PATENT DOCUMENTS

| | | | | |
|---|---|---|---|---|
| AU | 45557/96 A | * | 8/1996 | ..................... 100/3 |

* cited by examiner

*Primary Examiner*—Allen Ostrager
*Assistant Examiner*—Shelley Self
(74) *Attorney, Agent, or Firm*—Shapiro Cohen; Robert G. Hendry; Robert A. Wilkes

(57) ABSTRACT

An apparatus is provided for processing large hay bales of approximately 750 kg to produce smaller recompacted manageable units to facilitate shipping in containers. The apparatus provides means for cutting the bales into at least two slabs, preferably three slabs, and means for cutting these slabs into two approximately equal pieces. Means are provided for each piece to be recompressed, strapped and cut again to provide units having an approximate weight of 35 kg.

2 Claims, 4 Drawing Sheets

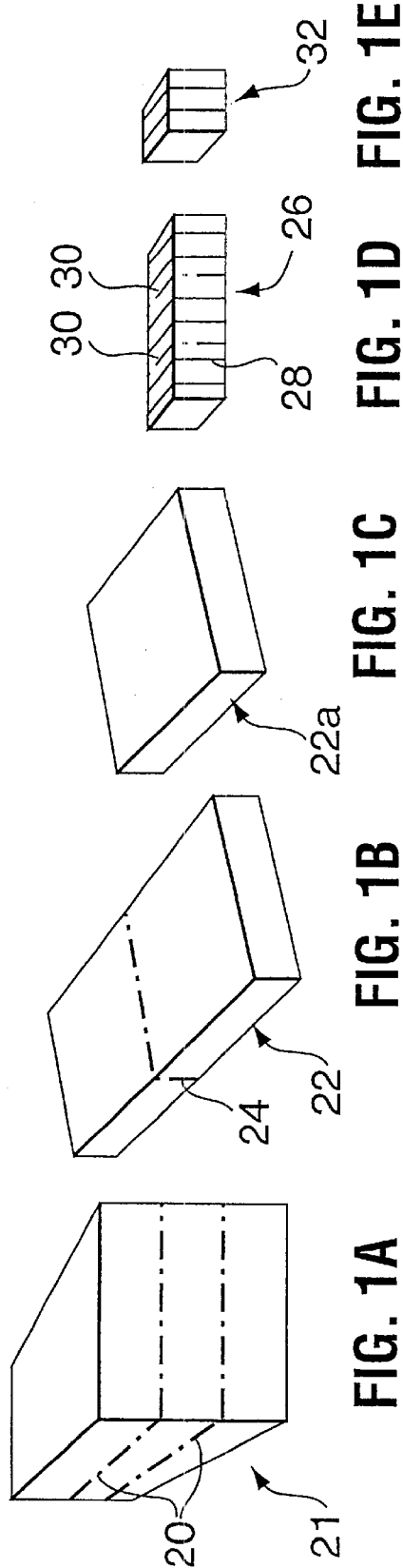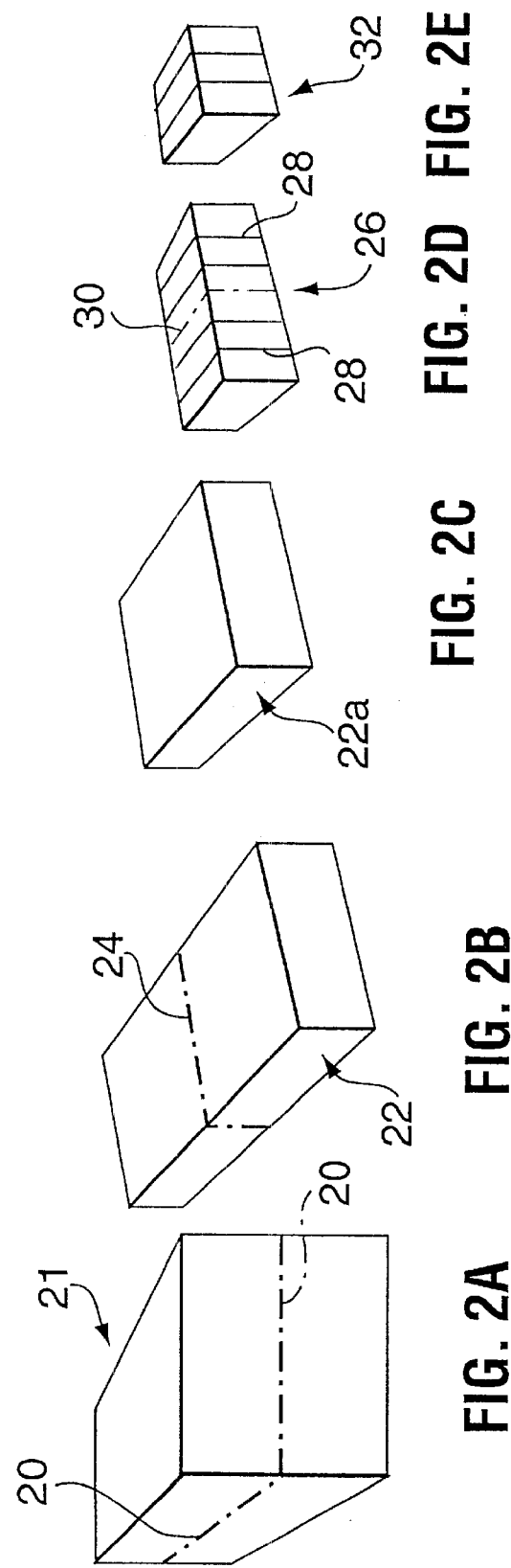

METHOD AND APPARATUS FOR PROCESSING LARGE SQUARE HAY BALES INTO SMALLER RECOMPRESSED BALES

This application is a divisional of U.S. Ser. No. 09/471,235 filed Dec. 23, 1999 U.S. Pat. No. 6,339,986.

FIELD OF INVENTION

This invention relates to compressed forage products, and in particular, to an apparatus for processing large square bales of hay into smaller, recompressed bales.

BACKGROUND OF INVENTION

There is a growing international market for recompressed hay, particularly in Japan and other Asian rim countries. Freight is one of the biggest costs in exporting hay overseas. Shipping is usually done in containers, which have a maximum weight limit. Freight is based on the number of containers, and so to minimize freight the container must be loaded to the maximum weight allowable. A typical hay bale, which consists of loose field hay which has been compressed once and strapped to form a bale, is too bulky to be transported overseas economically. Therefore, hay bales are commonly recompressed into smaller, denser bales before shipping.

Traditional recompression techniques were limited to small hay bales (approximately 35 to 40 kg; 16–18 in×16 in×48 in), e.g. U.S. Pat. No. 5,249,350. However, balers which produce large square bales (approximately 750 kg; and with approximate dimension of 48 in×52 in×96 in), have become increasingly popular, due to the increased efficiency of bale production. In particular, large square bales cost less in materials and man hours to produce, and are more efficiently handled and transported across land to export packaging facilities. These large square bales must be processed into smaller, denser bales before shipping, to reduce the costs of freight. It is also important that the bales be processed into smaller, more manageable units, because end users in Asian rim countries generally lack the necessary equipment to handle large, heavy bales. However, traditional recompression techniques are not capable of handling the immense size of large square bales. Accordingly, there is a need for a method of processing large square bales into a product that maximizes container weight, yet is light enough to be readily handled by the end user, without automated equipment.

The invention seeks to provide an apparatus for processing a large square hay bale into recompressed units, comprising in combination: a first cutting means for making at least one cut through the bale to produce at least two slabs of approximately equal size; a separating means for separating the slabs, adjacent to the first cutting means; a bale support, adjacent to the separating means; a compression chamber for recompressing the slabs, adjacent to the bale support means; a first moving means for moving the slabs along the bale support means and into the compression chamber; a second moving means for moving the slabs out of the compression chamber.

An advantage of the apparatus is that it efficiently processes a large square bale into smaller, denser bales, which are more cost-effective for overseas transport, and which may be more easily handled by end-users without automated equipment. A further advantage of the apparatus is that it produces multiple recompressed bales with each cycle of the recompression chamber, which allows for greater efficiency of production. A still further advantage of the apparatus is that it produces recompressed bales of uniform weight and good appearance.

BRIEF DESCRIPTION OF THE DRAWINGS

A better understanding of the invention will be obtained by considering the detailed description below, with reference to the following drawings of embodiments of the present invention in which:

FIGS. 1A to 1E are perspective views showing the processing of a large square hay bale using the apparatus of this invention.

FIG. 1A illustrates the step of making two horizontal cuts in the large square bale, to create three horizontal slabs.

FIG. 1B illustrates the step of making a vertical cut in the slab, to section off a unit having a desired weight.

FIG. 1C illustrates the unit, before recompression.

FIG. 1D illustrates the step of recompressing and strapping the unit.

FIG. 1E illustrates the step of cutting the recompressed unit into the desired end products, having the desired weights.

FIGS. 2A to 2E are perspective views showing an alternative embodiment of the present invention, for processing a large square bale of different dimension than that illustrated in FIGS. 1A to 1E.

FIG. 2A illustrates the step of making one horizontal cut in the large square bale, to create two horizontal slabs.

FIG. 2B illustrates the step of making a vertical cut in the slab, to section off a unit having a desired weight.

FIG. 2C illustrates the unit, before recompression.

FIG. 2D illustrates the step of recompressing and strapping the unit.

FIG. 2E illustrates the step of cutting the recompressed unit into the desired end products, having the desired weights.

DETAILED DESCRIPTION OF THE INVENTION

Figure 3:
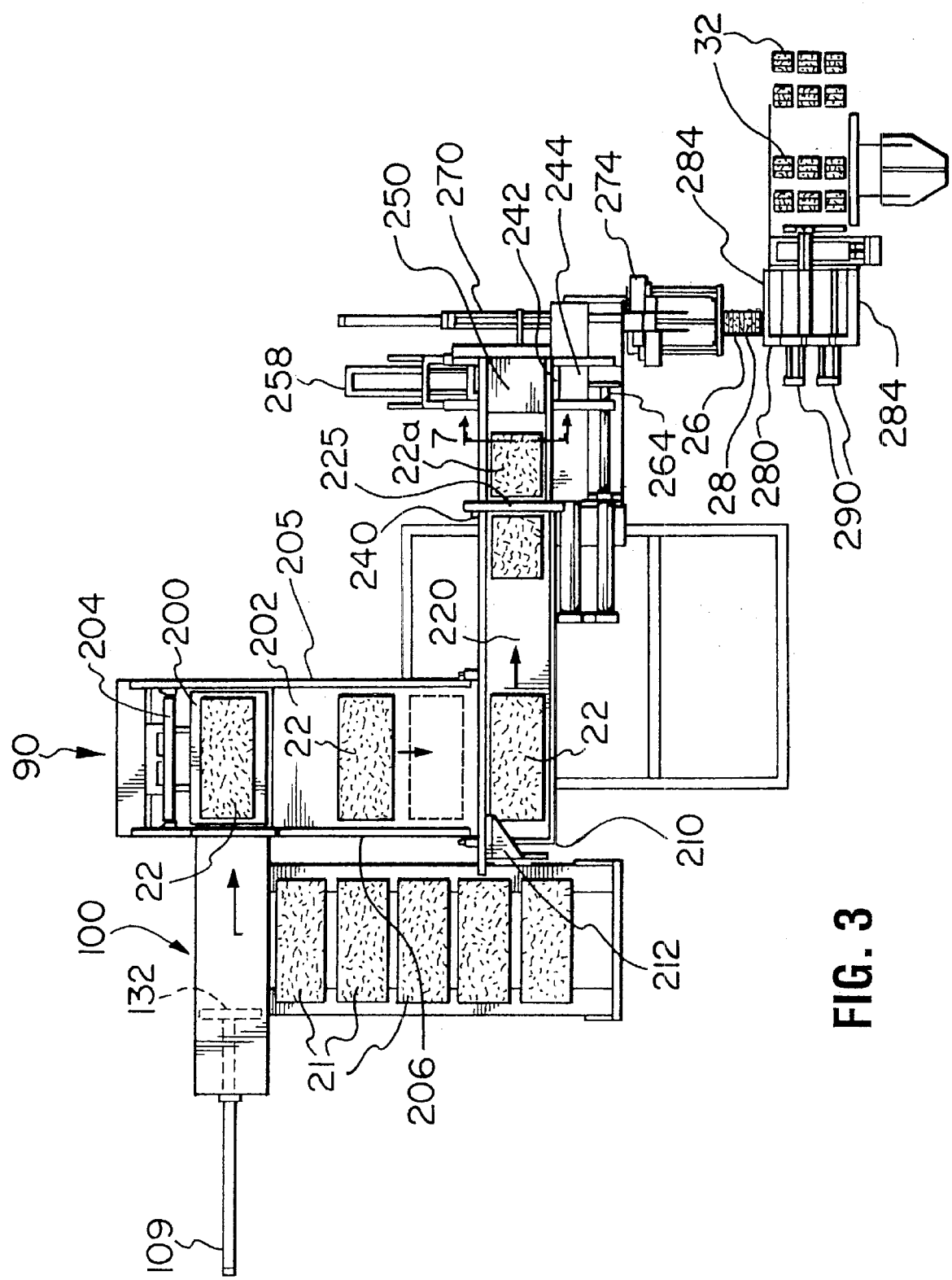
FIG. 3 is a top plan view of the apparatus.

Referring to FIGS. 1A to 1E and 2A to 2E, an apparatus for processing a large square hay bale 21 according to the present invention is used as follows. At least one horizontal cut 20 is made through the bale to produce slabs 22 of approximately equal size. A typical large square bale has a plurality of binding straps, and the cut 20 is made between straps in a direction substantially parallel to the direction of the straps. The slabs 22 are then separated from each other and moved along a bale support towards a compression chamber. A vertical cut 24 is made through a slab 22 to produce a unit 22a of a desired weight to fill the compression chamber. The unit 22a is compressed in the compression chamber to provide a compressed unit 26, removed from the compression chamber, and strapped using a plurality of straps 28 in a spaced apart relationship, such that a vertical cut 30 may be made between the straps 28 to produce an end product 32 of a desired weight.

It will be appreciated that the apparatus is suitable for large square bales of various sizes, and may also be used for processing smaller bales, with appropriate adjustments to the number of cuts. For example, in FIGS. 1A to 1E, a large square bale having the dimensions of 96 in×52 in×48 in, is processed by making two horizontal cuts 20 through the hay bale to produce three slabs 22 of approximately equal size. A vertical cut 24 is made through a slab 22 to produce a unit 22a having a desired weight. After compression and strapping, two vertical cuts 30 are made through the compressed unit 26 to produce an end product 32 having approximate dimensions of 16 in×17.5 in×18 in.

In another embodiment, shown in FIGS. 2A to 2E, a large square bale having the dimensions of 96 in×36 in×36 in, is processed by making one horizontal cut 20 through the hay bale to produce two slabs 22 of approximately equal size. A vertical cut 24 is made through a slab 22 to produce a unit 22a of a desired weight to fill the compression chamber. After compression and strapping, one vertical cut 30 is made through the compressed unit 26 to produce an end product 32 having approximate dimensions of 16 in×18 in×18 in.

It will be appreciated that one may vary the weight of the end product 32 by adjusting the weight of the unit 22a used to fill the compression chamber and/or the number of vertical cuts 30 made to the compressed unit 26.

Figure 4:
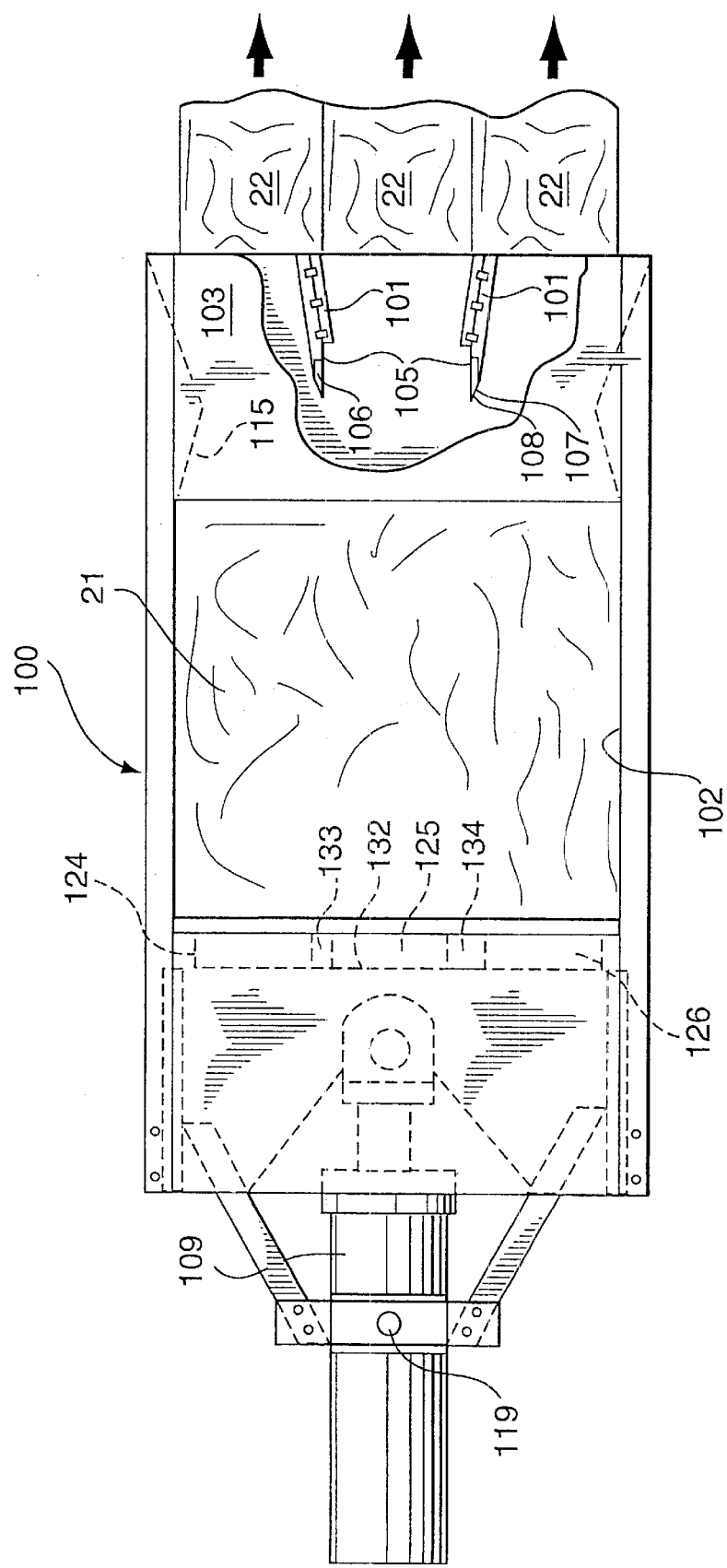
FIG. 4 is a side view of another section of the apparatus wherein a bale is forced against a stationary horizontal knife.

An apparatus comprising a first embodiment of the invention is shown generally at 90 in FIG. 3 and includes a bale cutter shown at 100 in FIG. 4.

As shown in FIG. 4 a bale 21 is moved into contact with stationary knives 105. Knife attachment members 101 are secured as by welding to opposed side knife support members 103 adjacent one end of a bale bed 102.

Each of the knives 105 has a flat side 106, a bevelled side 107 and a cutting edge 108. The knives 105 are spaced apart to define three approximately equal compartments having a top edge equipped with a pressure plate 115 secured to the side plates 103.

In an alternate embodiment, the cutting device may have only one horizontal knife or multiple horizontal knives.

A cylinder 109 mounted on a pivot 119 at an end of the bale bed 102 remote from the knives 105 has an inner end secured to the side of a ram head 132. The ram head 132 has upright transversely extending pusher plates 124, 125 and 126 secured thereto as by welding. Spaces 133 and 134 are provided at the ends of the plate 125, and are in alignment with the knives 105 and a space at the outer end of the plate 124 accommodates the pressure plate 115.

Figure 6:
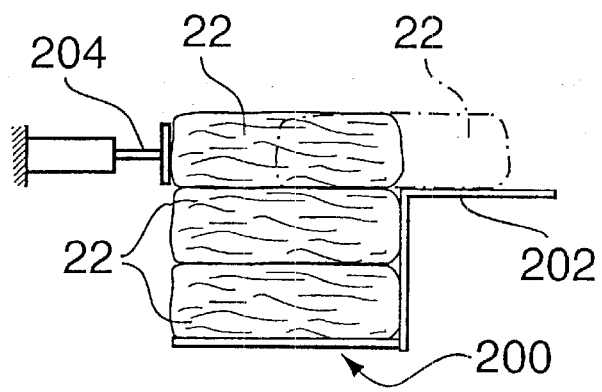
FIG. 6 is a schematic front view of an elevator.

In operation, a bale 21 is placed on the bale bed 102 and the hydraulic cylinder 109 actuated thereby forcing a bale 21 against the cutting edge 108 of the knives 105. The upper side of the bale 21 contacts the pressure plate 115 to minimize deformation of the bale 21. The knives 105 can extend into the spaces 133 and 134 to complete the cutting of a bale 21 into three slabs 22 which are received on an elevator platform separating device 200. The elevator platform 200 (as shown more clearly in FIG. 6) moves between a down position, where it is in alignment with the bale bed 102, and an up position, where it is in alignment with a bale support 202, and is indexed to stop as each of the slabs 22 is in alignment with the bale support 202. A pusher 204 is then activated as one of the slabs 22 is aligned with the bale support 202 and off loads an upper one of the slabs 22 onto the bale support 202. The pusher 204 moves upwardly and rearwardly before descending for the next cycle.

As shown in FIG. 3, the bale support 202 is provided with vertical sides 205 and 206 to guide the slab 22. The bale support 202 has a right angle bend at 210 and a pusher 212, similar to pusher 204, engages an end of a slab 22 to move the slab towards a weigh station 220 and a second cutting knife 225.

Figure 5:
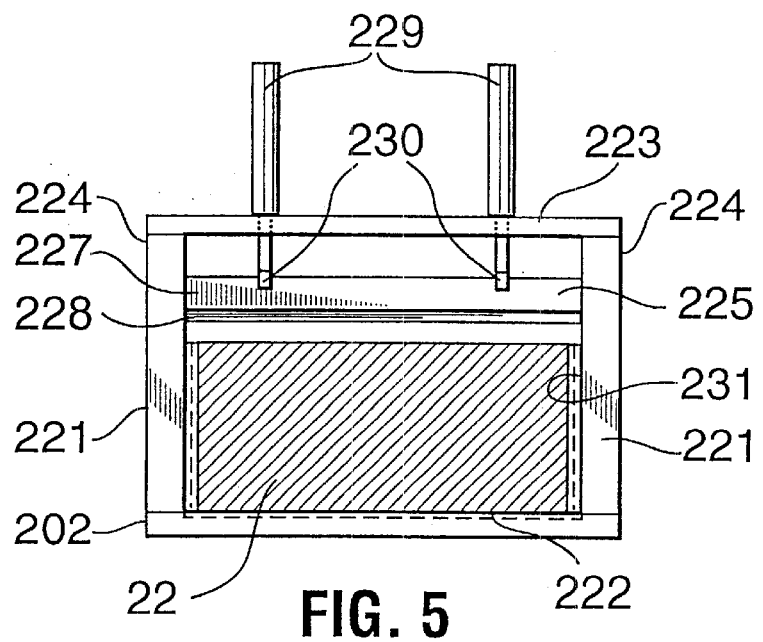
FIG. 5 is a front view of a vertical knife for use in the apparatus.

FIG. 5 shows a preferred embodiment of part of the invention 90 in which knife guide members 221 are attached, by welding or similar conventional means, to opposed sides 205 and 206 of the bale support 202. Cross member 223 is similarly attached to the upper ends 224 of the knife guide members 221. The knife 225 has a flat side (not shown) and a bevelled side 227 meeting at a cutting edge 228, and is mounted on cutting hydraulic cylinders 229 by means of clevises 230 so as to be slidably engaged in guide channels 231. Cutting channel 222 accommodates the knife cutting edge 228 when the knife 225 is in the lowered position.

Figure 7:
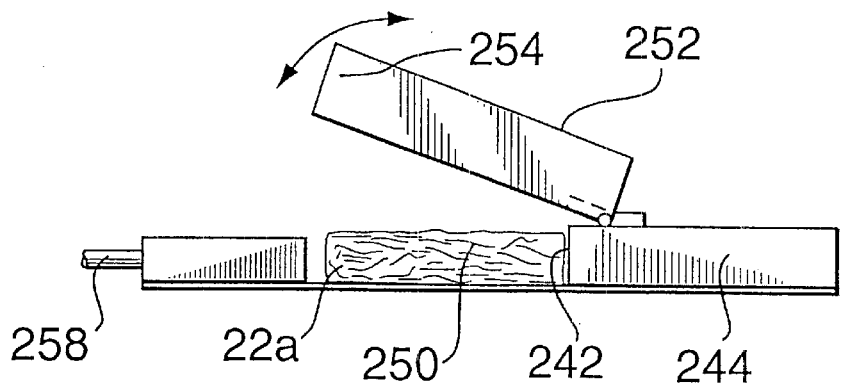
FIG. 7 is a cross-sectional view of a compactor of the embodiment taken along the line 7—7 of FIG. 3.

Referring again to FIG. 3, another pusher means 240, similar to the pusher 204, is preferably provided to move cut slab 22a in front of inlet opening 242 of the compression chamber 244. As shown more clearly in FIG. 7 the compression chamber 244 is provided with guide means 250 hingedly attached at the compactor inlet 242. The guide means has a top wall 252 and two side walls 254 and 256. It will be appreciated that the guide means 250 is raised before the cut slab 22a is moved to the compression chamber 244. When the cut slab 22a is in position, the guide means 250 is lowered and a rectangular ram provided with suitable hydraulic means 258 is adapted to move the cut slab 22a into the compression chamber 244. The major portion of the compaction or compression is provided by a hydraulically operated ram 264 which moves parallel to the table 202. A compressed unit 26 is ejected by an ejection ram 270 and is positioned in a banding or strapping station. The bale strapping machine 274 moves along the length of the recompressed unit 26 providing straps 28 at the required intervals. The recompressed unit 26 is not capable of being easily handled without machinery and therefor further subdividing of the recompressed unit 26 is carried out in the cutter box 280. A ramp may be sloped downwardly from the strapping machine 274 to the cutter box 280 to feed the recompressed units 26 into the cutter box 280. The cutter box 280 is positioned to receive recompressed units 26 leaving the strapping station 274 and has walls 284 to guide the recompressed units 26 as hydraulic rams 290 move the bale slab through at least one vertical knife which divides the recompressed unit 26 into smaller units 32 of approximately equal size. In a preferred embodiment, the cutter box 280 contains two vertical knives. The vertical cuts are made between the straps in a direction substantially parallel to the direction of the straps. A second elevator receives the smaller units 32 after they pass through vertical knives, and lowers them to the ground, where a moving device pushes the smaller units 32 from the second elevator onto the ground.

The embodiments of the invention in which an exclusive property or privilege is claimed are defined as follows:

1. Method of processing a large square hay bale, into recompressed units comprising the steps of:
   (a) making at least one cut through said bale to produce at least two slabs of approximately equal size:
   (b) elevating the slabs using elevator means having a platform which is movable between a down position, wherein receives the slabs of the bale, and an up position, wherein it is substantially level with a bale support means, and pushing the slabs one a time from the elevator means onto the bale support means, using a moving means:

(c) recompressing said slabs in a compression chamber; and (d) removing said slabs from the compression chamber, wherein the bale has a plurality of binding straps, and wherein the cut is made between at least two of the straps in a direction substantially parallel to the direction of the straps, and wherein said cut is made by pushing the bale through at least one stationary horizontal knife using a hydraulically actuated plate.

2. Method of processing a large square hay bale, into recompressed units comprising the steps of:

(a) making at least one cut through said bale to produce at least two slabs of approximately equal size;

(b) elevating the slabs using elevator means having a platform which is movable between a down position, wherein it receives the slabs of the bale, and an up position, wherein it is substantially level with a bale support means, pushing the slabs one a time from the elevator means onto the bale support means, using a moving means and moving said slabs along said bale support means to said compression chamber, (c) recompressing said slabs in a compression chamber; and (d) removing said slabs from the compression chamber, wherein the bale has a plurality of binding straps, and wherein the cut is made between at least two of the straps in a direction substantially parallel to the direction of the straps, and wherein said cut is made by pushing the bale through at least one stationary horizontal knife using a hydraulically actuated plate.

\* \* \* \* \*